United States Patent Office 2,998,363
Patented Aug. 29, 1961

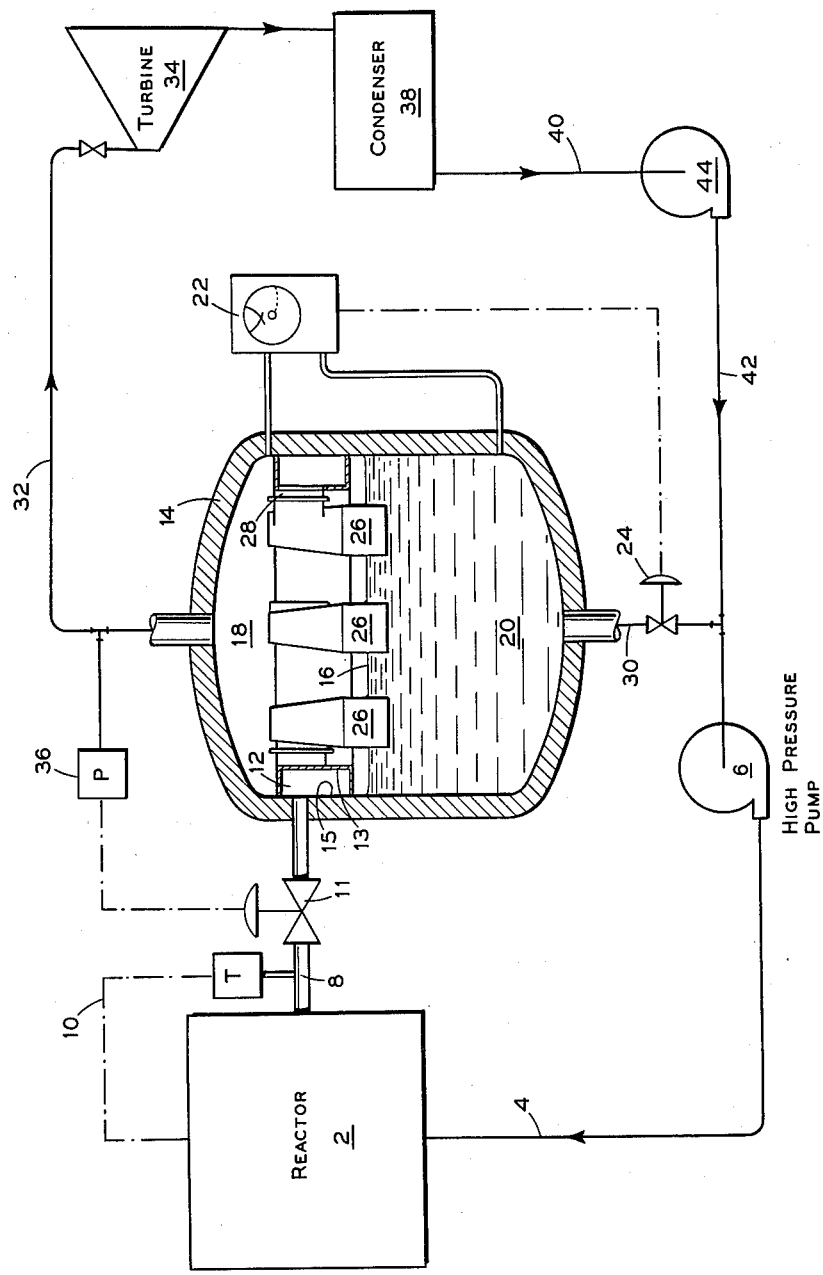

2,998,363
NUCLEAR POWER PLANT
Robert U. Blaser, Alliance, Ohio, assignor to The Babcock & Wilcox Company, New York, N.Y., a corporation of New Jersey
Filed May 31, 1955, Ser. No. 512,227
3 Claims. (Cl. 204—154.2)

This invention relates in general to a nuclear reactor power system and more particularly to a system for handling the cooling fluid of a vaporizable liquid cooled nuclear reactor.

It has heretofore been the practice to pressurize the cooling liquid and to maintain the temperature of the liquid leaving the reactor to a value a few degrees below the saturation temperature corresponding to that pressure. Such a condition of the liquid is generally referred to as sub-cooled. Under such circumstances, the degree of subcooling regulates the heat liberation rates in the core of the reactor so that the temperature difference between the highest value fuel plate temperature and the bulk temperature of the cooling liquid is less than the degrees of subcooling of the liquid whereby boiling or vapor generation in the reactor core is avoided. This non-boiling operation is dictated by reactor physics considerations because in many reactors, it reduces the fuel inventory required and simplifies the control problems. As there is no net vapor generation in such a system, the liquid is usually passed through an indirect type heat exchanger in which there is generated vapor at a lower pressure for subsequent expansion through a prime mover. Although this system facilitates the design and operation of the reactor, it unduly complicates the apparatus which completes the conversion of thermal energy to mechanical energy because of the heat exchanger. This heat exchanger for cooling the reactor primary coolant must be built for service under severe operating conditions in terms of temperature, pressure and heat transfer conditions. Because the primary cooling fluid is usually radioactive due to the impurities therein, the heat exchanger must be designed to be leak-proof. Although it is impossible to guarantee leak-proofness, any approach to such a condition by welding tubes into tube sheets, welding tight the inspection and cleanout fittings and providing for adequate differential thermal expansion is bound to be expensive. Further, the primary cooling system is usually made out of material which is resistant to corrosion of the primary coolant and as such is normally stainless steel, this being an expensive material of construction. Of course, the necessary piping systems involving both a primary and a secondary system is both complicated and expensive.

The present invention provides a reactor power system in which a vaporizable liquid cooled reactor has a liquid pumped through it at a high pressure with the liquid exit temperature from the reactor being controlled to a value a few degrees below its saturation. The liquid upon leaving the reactor in its slightly subcooled condition is passed through a throttling conduit so that it is adiabatically expanded to a substantially lower pressure to form a vapor-liquid mixture. This mixture is passed into a vapor-liquid separator where the vapor and the liquid are separated. The vapor is then passed on to a point of use (i.e. a prime mover) and the separated liquid is taken by a pump and recirculated to the reactor. An amount of make-up liquid equivalent to the steam delivered is also returned to the reactor.

Such a system eliminates the need for a dual heat transport system and results in a material reduction in the complexity and expense of a reactor system.

The various features of novelty which characterize the invention are pointed out with particularity in the claims annexed to and forming a part of this specification, but for a better understanding of the invention, its operating advantages and specific objects attained by its use, reference should be had to the accompanying drawing and descriptive matter in which there is illustrated and described a preferred embodiment of the invention.

In the drawing, a vaporizable liquid cooled reactor 2 is fed a cooling liquid by an inlet line 4 under the impulse of a circulating pump 6. The liquid leaves the reactor 2 and enters a throttling conduit 8. In the conduit 8, there is a temperature sensing device 10 arranged to control the power output of the reactor in response to such temperature so that the liquid is maintained slightly subcooled to a degree assuring no boiling in the reactor. This slightly subcooled liquid is then adiabatically expanded to a considerably lower pressure by a pressure reducing device 11 so that a large amount of vapor appears in the reduced pressure fluid as a direct result of the expansion process. This vapor-liquid mixture is then introduced into an inlet chamber 12 of a vapor-liquid separator tank or pressure vessel 14.

The vapor-liquid mixture inlet chamber 12 consists of an annular shaped ring 13 disposed within, and around the wall of the pressure vessel in its upper portion and uses the inner wall 15 of the vessel as a wall of the inlet chamber. Within the vessel, there is a water level 16 separating the upper vapor space 18 from the lower liquid space 20 and there being a water level controller 22 arranged to control the liquid level by the operation of an outlet valve 24 in response to variations in the liquid level.

Within the pressure vessel 14, there is a plurality of cyclone type vapor-liquid separators 26, of the type described in the patent to Rowand et al., 2,289,970, in which the inlets 28 of the separators 26 are in communication with the inlet chamber 12 and the separators are disposed in a circular pattern. The separators separate the liquid from the vapor in such a manner that the liquid flows into the liquid space 20 and the vapor flows into the vapor space 18. The separated liquid flows via the conduit 30 to the inlet of the circulating pump 6 while the vapor leaves the upper portion of the upper pressure vessel via line 32 and passes to the prime mover 34.

The pressure sensing element 36 is used to regulate the adiabatic expansion process in the device 10 in response to vapor pressure. After the vapor flows through the turbine it passes into the main condenser 38 where it is condensed, the resulting condensate passing via lines 40 and 42 and under the impulse of the feed pump 44 to the reactor coolant circuit.

In the above described system, the vapor-liquid separator and the throttling device in combination produce a quantity of a vapor capable of being used in a vapor-driven prime mover. Both the throttling device and the separator are simple of construction and require no multiplicity of small parts which require extremely careful fabrication techniques, therefore, these devices are inexpensive to fabricate.

An example of the above described system favorable to steam generation efficiency would have water in the reactor at 2500 p.s.i., the outlet temperature being 600° F., or 68° F. below the saturation temperature. The throttling device would reduce the pressure to 1050 p.s.i. thus forming a steam-water mixture in which there is approximately 10% steam at the saturation temperature of 550° F. The 10% steam is then separated and delivered to the turbine, with the 90% separated liquid plus 10% make-up being returned to the reactor.

The present system may also be applied to a boiling reactor, that is, a reactor in which there is a net amount of vapor generated and delivered to the coolant exit of the reactor. In this case, it is desirable from a nuclear standpoint to maintain the quantity of vapor, by volume, in the mixture at a small value in order to maintain predictable and controllable nuclear conditions within the reactor core, thus, the reactor would be operated at a high pressure. Here also a large steam quantity at a lower pressure in required at a prime mover, thus, the throttling device would adiabatically reduce the pressure to a lower value while the net amount steam delivered to a turbine is a much larger value than is in the reactor. The remainder of the system would operate exactly as described above.

While the system is best used with a heterogeneous reactor, it may be effectively used with an aqueous reactor in which uranyl sulfate is in a water solution. Thus, the fuel and liquid would be separated from the steam after the fuel solution is passed through a throttling device.

While in accordance with the provisions of the statutes I have illustrated and described herein, a specific form of the invention now known to me, those skilled in the art will understand that changes may be made in the form of the apparatus discussed without departing from the spirit of the invention covered by my claims, and that certain features of the invention may be used to advantage without the corresponding use of other features.

What is claimed is:

1. A method of generating vapor comprising causing a nuclear chain reaction to release large quantities of heat at varying rates over a wide range thereof, passing a vaporizable liquid at a predetermined pressure through said chain reacting zone to absorb heat therefrom, adiabatically expanding the heated fluid to a predetermined lower pressure to form a vapor-liquid mixture, passing said vapor-liquid mixture into a separation zone, separating the vapor from the liquid, passing the separated vapor to a vapor collection zone for subsequent delivery to a point of use, passing the separated liquid to a liquid collecting zone, returning the collected separated liquid from said collecting zone back to said chain reacting zone at said first named predetermined pressure, introducing feed liquid into said chain reacting zone at a rate equal to the rate of steam separated, and controlling the amount of expansion of said heated fluid in response to the variation of pressure within said vapor collecting zone.

2. A method of generating vapor comprising causing a nuclear chain reaction to release large quantities of heat at varying rates over a wide range thereof, passing a vaporizable liquid at a predetermined pressure through said chain reacting zone to absorb heat therefrom, controlling the flow of said liquid to maintain a slightly subcooled condition leaving the chain reacting zone, adiabatically expanding the heated fluid to a predetermined lower pressure to form a vapor-liquid mixture, passing said vapor-liquid mixture into a separation zone, separating the vapor from the liquid, passing the separated vapor to a vapor collection zone for subsequent delivery to a point of use, passing the separated liquid to a liquid collecting zone, returning the collected separated liquid from said collecting zone back to said chain reacting zone at said first named predetermined pressure, and introducing feed liquid into said chain reacting zone, at a rate equal to the rate of steam separated, and controlling the amount of expansion of said heated liquid in response to the variation of pressure within said vapor collecting zone.

3. A method of generating vapor comprising causing a nuclear chain reaction to release large quantities of heat at varying rates over a wide range thereof, passing a vaporizable liquid at a predetermined pressure through said chain reacting zone to absorb heat therefrom, controlling the flow of said liquid to maintain the heated fluid as a vapor-liquid mixture upon leaving said chain reacting zone, adiabatically expanding the heated fluid to a predetermined lower pressure to increase the quantity of vapor in said vapor-liquid mixture, passing said vapor-liquid mixture into a separation zone, separating the vapor from the liquid, passing the separated vapor to a vapor collection zone for subsequent delivery to a point of use, passing the separated liquid to a liquid collecting zone, returning the collected separated liquid from said collecting zone back to said chain reacting zone at said first named predetermined pressure, and introducing feed liquid into said chain reacting zone at a rate equal to the rate of steam separated, and controlling the amount of expansion of said heated liquid in response to the variation of pressure within said vapor collecting zone.

References Cited in the file of this patent

UNITED STATES PATENTS

| | | |
|---|---|---|
| 1,559,763 | Nicholson | Nov. 3, 1925 |
| 2,289,970 | Ruivland et al. | July 14, 1942 |
| 2,429,035 | Steving | Oct. 14, 1947 |
| 2,654,351 | Ammon | Oct. 6, 1953 |
| 2,669,976 | Frisch | Feb. 23, 1954 |
| 2,708,656 | Fermi et al. | May 17, 1955 |
| 2,787,593 | Metcalf | Apr. 2, 1957 |
| 2,806,820 | Wigner | Sept. 17, 1957 |

OTHER REFERENCES

Nuclear Reactor Development. Proceedings May 24, 1954, Sheraton Park Hotel, Washington, D.C., Atomic Industrial Forum, Inc., 260 Madison Ave., New York 16, N.Y., pages 18–23.